United States Patent [19]

Shimizu

[11] 4,447,021

[45] May 8, 1984

[54] TAPE CARTRIDGE OF CASSETTE SYSTEM

[76] Inventor: Tokuzo Shimizu, 2-4-7, Tamagawa Denenchofu, Setagaya-ku, Tokyo, Japan

[21] Appl. No.: 350,656

[22] Filed: Feb. 22, 1982

[51] Int. Cl.³ .................. G03B 1/04; G11B 15/32
[52] U.S. Cl. .................................. 242/199; 242/197
[58] Field of Search ........................... 242/197–200, 242/192, 55, 19 A, 71.8, 192, 194; 360/93, 132

[56] References Cited

U.S. PATENT DOCUMENTS 3,756,535  9/1973  Miller ........................... 242/197
4,102,514  7/1978  Ito ................................. 242/199

FOREIGN PATENT DOCUMENTS 0003653  8/1979  European Pat. Off. ............ 242/199
54-4790   4/1979  Japan ................................ 242/199

Primary Examiner—Leonard D. Christian
Attorney, Agent, or Firm—James Creighton Wray

[57] ABSTRACT

The tape cartridge of cassette system has sliding sheets of disc form to be mounted on the reel hubs within the cassette half so as to rotate with the reel hubs, thereby inhibiting any drawbacks such as increase of take-up torque to tend to stop and cut the tape and bad influences upon the rotating speed of the tape or wow or flutter.

9 Claims, 4 Drawing Figures

TAPE CARTRIDGE OF CASSETTE SYSTEM

BACKGROUND OF THE INVENTION

The present invention relates to improvements in cassette tape cartridge systems.

In the conventional tape cassettes, as shown in FIG. 2, thin sheets 2, 2 made of a film of tetrafluoroethylene and so on are mounted inside cassette halves 1 so that the cassette half 1 does not directly contact a reel hub 4 and/or a wound tape body. However, when the sheet 2 is used in a rectangular form having almost the same size of the conventional cassette half, the tape is undesirably stretched or braked by the sides with the increase of the time for using the cassette tape. As a result, bad influences upon the reproduction of sounds have been caused. Both sides of the tape become deformed, and accordingly, the frictional force contacting to the sheet increases with the rotation of the tape, resulting in increasing the take-up torque which renders the tape unrotatable or causes unevenness of rotation. Moreover, due to the long period of use, not only the tape, but the surface of the sheet becomes coarse, which results in increasing the frictional force.

SUMMARY OF THE INVENTION

The present invention is to provide a new tape cartridge of cassette system which overcomes the drawbacks of the conventional one.

The object of the present invention is to provide rotatable sliding sheets on reel hubs within the cassette half instead of the conventional rectangular sheets.

DETAILED DESCRIPTION OF THE INVENTION

The present invention is explained referring to the accompanied drawings.

Figure 1:
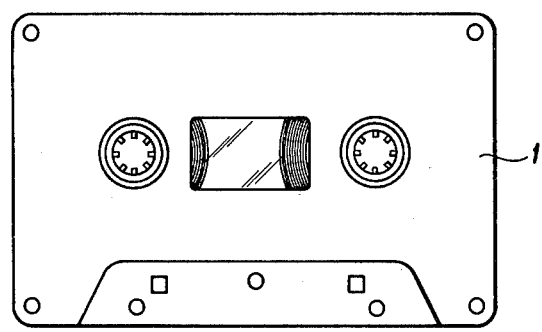
FIG. 1 is a view which shows an outer appearance of a cassette tape.
Figure 2:
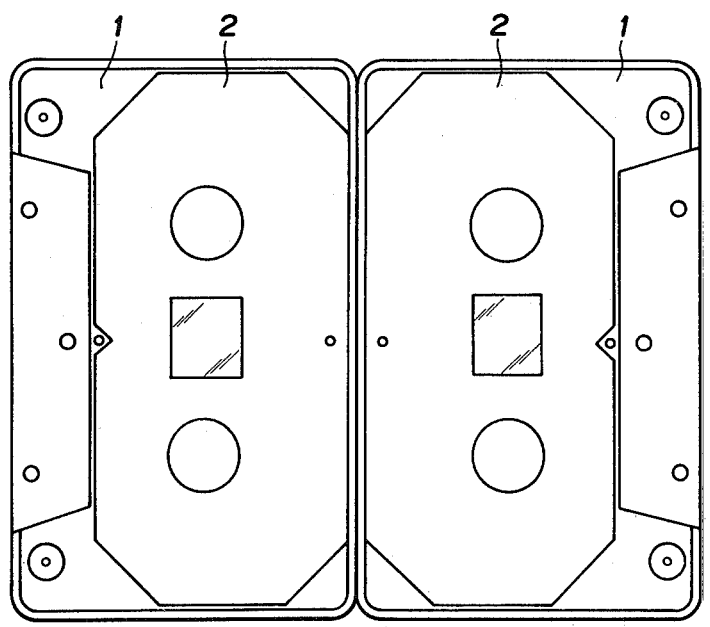
FIG. 2 is a developed view of the conventional sliding sheet.
Figure 3:
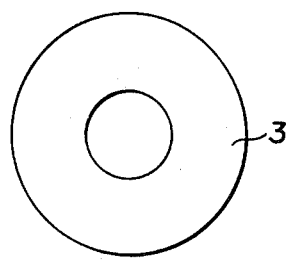
FIG. 3 is a view showing the sliding sheet of the present invention.
Figure 4:
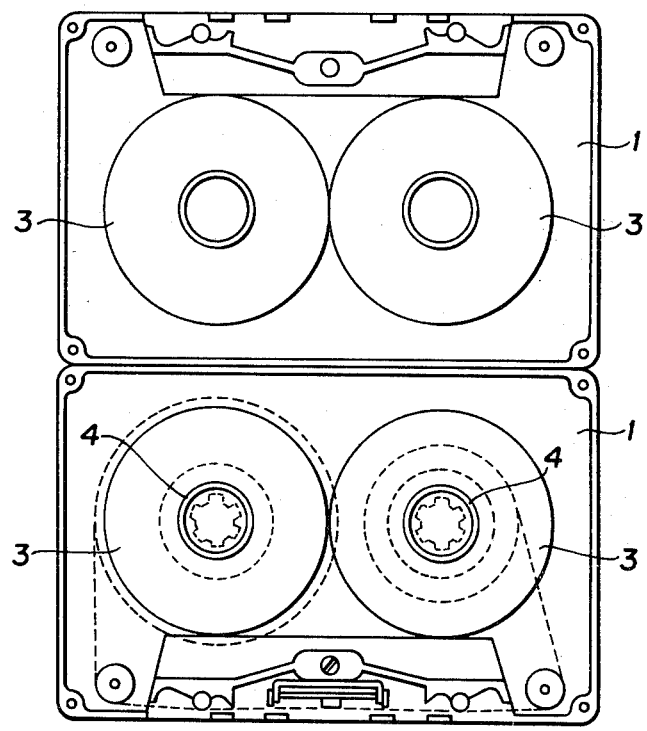
FIG. 4 is a developed view showing the example in which the present invention is used in a cassette tape.

In FIGS. 1 and 2, the reference numeral 1 is a cassette half and the reference numeral 2 is a conventional sheet made of a film of tetrafluoroethylene. In order to solve the drawbacks mentioned in the Paragraphs of "Background of the Invention", the present invention makes sliding sheets 3, 3 as donut-type discs, and using heat and pressure applies Teflon particles on the surface of the sheets 3, 3, as shown in FIGS. 3 and 4. The diameter of the disc is preferred to be about 38 mm in the outer diameter in consideration of 41.5 mm of the distance between the reel hubs. With respect to the thickness of Teflon particles to be hot-pressurizedly applied, it is enough to be about $1\mu$.

As shown in FIG. 4, the sliding sheets 3, 3 constructed as described above are mounted on the respective reel hubs 4, 4 on right and left sides within the cassette half 1. Now, when the take-up of the tape is started, both sliding sheets 3, 3 rotate within the cassette half, accompanying the rotation of the tape, although the wound tape body for supplying the tape is formed larger than the sliding sheet 3 in relation to the recording hours. As the size of the diameter of the wound tape body on the supplying side decreases, the diameter of the wound tape body on the taking-up side increases, so that the sliding sheet 3 on the taking-up side rotates together with the wound tape body on the taking-up side. According to thus constructed cassette tape, even in case the side edges of the tape become deformed under long periods of use resulting in increasing frictional force between the side edges of the tape and the sheets 3, 3 and that the surfaces of the sheets 3, 3 become coarse which renders the slidability of the tape to be insufficient, there can be no risks that the take-up torque of the tape increases to stop the tape and to cut the tape, because of the fact that the sliding sheets 3, 3 themselves rotate together with the reel hubs 4, 4. Furthermore, since the tape can be smoothly rotated at all times, there gives no influences upon the rotating speed of the tape and/or wow or flutter.

What is claimed is:

1. Tape cartridge cassette system having right and left reel hubs including sliding sheets mounted within a cassette half made in circular form of a size almost a same size as a wound tape body and said sliding sheets rotatably provided on both side faces of right and left reel hubs, respectively.

2. Tape cartridge cassette apparatus comprising first and second cassette halves having reel hubs extending inward therefrom and tape sliding sheet discs mounted for rotation on the reel hubs for rotating with wound tape on the hubs.

3. The tape cartridge cassette apparatus of claim 2 wherein the hubs are formed on insides of the cassette halves and extend inward in the cassette halves for rotatably receiving tape and wherein the discs are mounted on the hubs inside of the halves between inner surfaces of the halves and the tape and wherein the discs extend radially outward from the hubs.

4. The apparatus of claim 3 wherein the discs extend radially outward toward each other.

5. The apparatus of claim 2 wherein four discs are positioned within the cassette halves, two discs being mounted on two hubs on each half.

6. The apparatus of claim 2 wherein the discs are made as donut-type discs on which teflon particles are applied using heat and pressure.

7. The apparatus of claim 6 wherein the teflon particles are approximately one micron in thickness.

8. The apparatus of claim 2 wherein the discs are about 38 mm in outer diameter.

9. The apparatus of claim 2 wherein the discs are of smaller outer diameter than an outer diameter of a wound tape body when the body is wound on one reel.

* * * * *